United States Patent
Dreyling et al.

[15] 3,656,977
[45] Apr. 18, 1972

[54] REFRACTORY COMPOSITION

[72] Inventors: Alfred P. Dreyling; Lewis J. Dreyling, both of East Brunswick, N.J.

[73] Assignee: Quigley Company, Inc.

[22] Filed: Oct. 1, 1969

[21] Appl. No.: 862,817

Related U.S. Application Data

[63] Continuation-in-part of Ser. No. 751,506, Aug. 9, 1968, abandoned, which is a continuation-in-part of Ser. No. 391,182, Aug. 21, 1964, abandoned.

[52] U.S. Cl..........................106/55, 106/57, 106/58, 106/59, 106/65, 106/84
[51] Int. Cl.............................C04b 35/04, C04b 35/42
[58] Field of Search...............106/57, 55, 58, 59, 74, 84, 106/65

[56] References Cited

UNITED STATES PATENTS

| | | | |
|---|---|---|---|
| 2,812,241 | 11/1957 | Austin et al. | 106/59 |
| 3,257,217 | 6/1966 | Van Dreser et al. | 106/58 |

*Primary Examiner*—James E. Poer
*Attorney*—Connolly & Hutz

[57] ABSTRACT

A refractory material is premixed with a binder consisting essentially of a mixture of sodium silicate and ammonium pentaborate, to give a refractory composition having a relatively short setting time when mixed with a given amount of water which setting time is predetermined by selecting a weight ratio for the silicate and the pentaborate within a given range.

2 Claims, 2 Drawing Figures

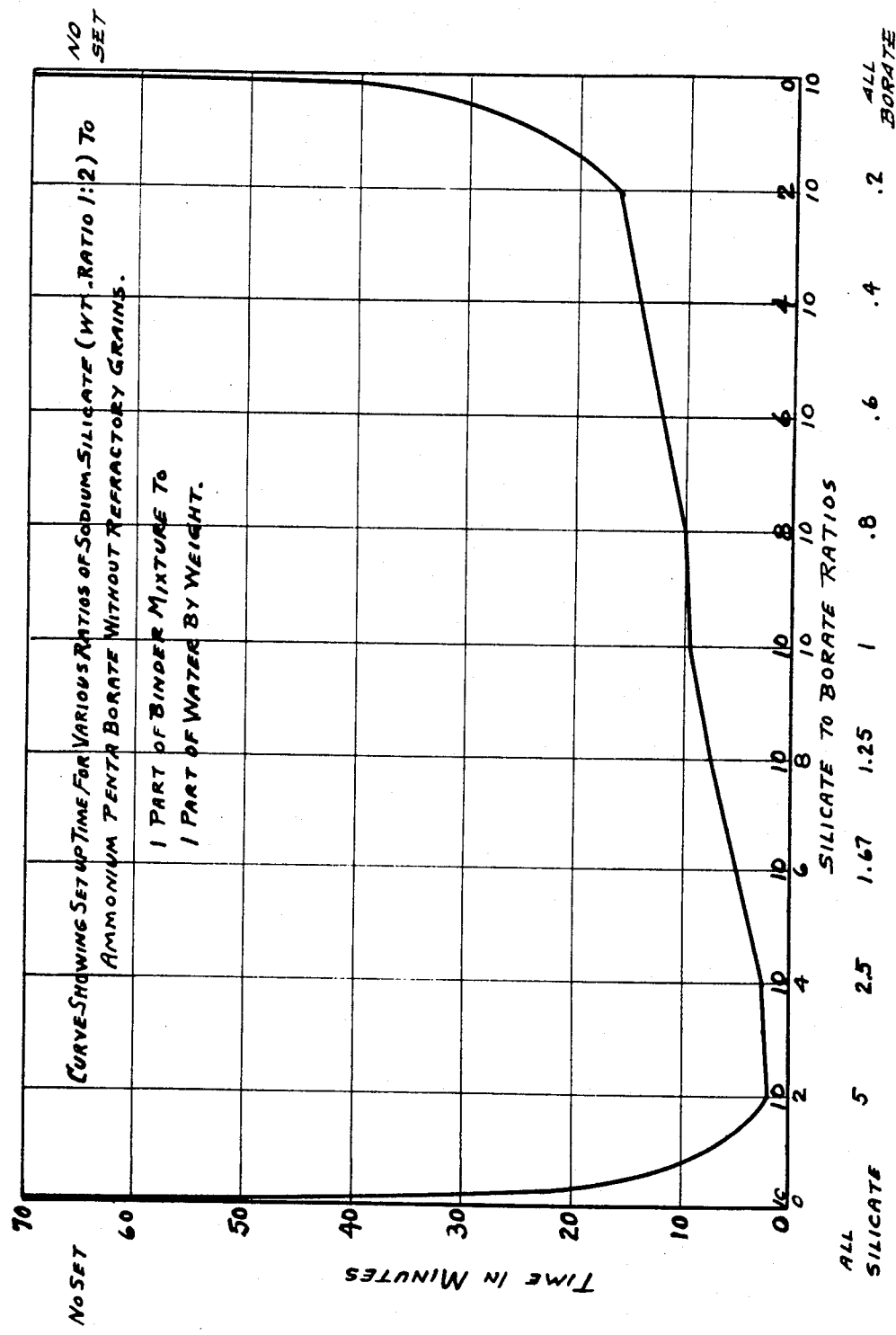

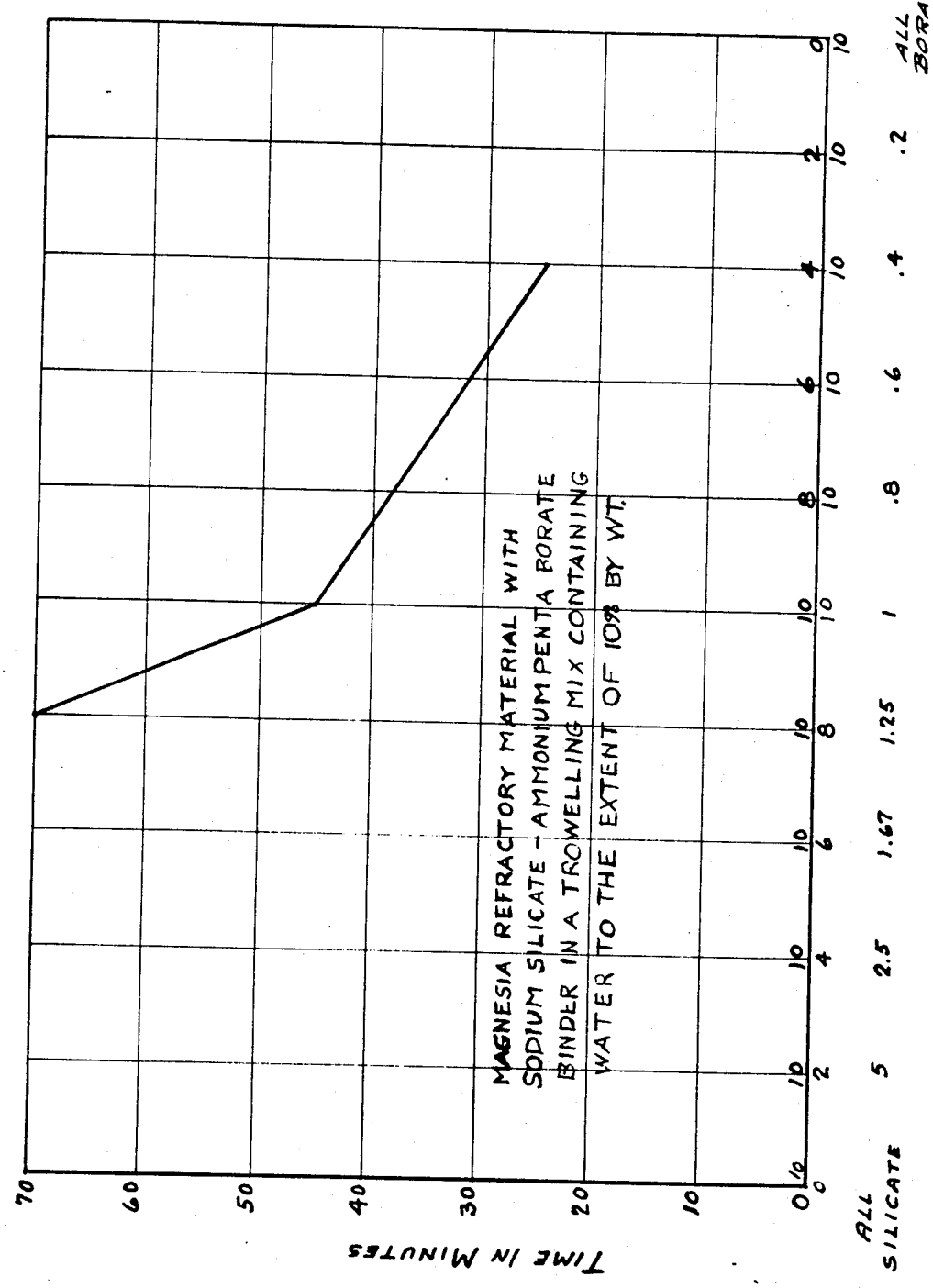

REFRACTORY COMPOSITION

SUMMARY OF INVENTION

This application is a continuation-in-part of application Ser. No. 751,506, filed Aug. 9, 1968 by Alfred P. Dreyling and Lewis J. Dreyling for Refractory Composition, now abandoned, and which in turn was a continuation-in-part of application Ser. No. 391,182, filed on Aug. 21, 1964 by Alfred P. Dreyling and Lewis J. Dreyling for Refractory Compositions and Method of Controlling Setting Times, now abandoned.

This invention relates to refractory compositions of the type used in repairing furnaces and more particularly to binders contained therein initially to set and hold the refractory particles in place until heat is applied to fire the composition to its ultimate refractoriness.

Heretofore the demand for quick setting refractory compositions has been supplied by the use of quick setting cements, such as calcium aluminates but such cements result in products having a high degree of shrinkage. Other expedient used as a binding media for refractory products include sodium silicate, borax, etc. But these materials require the evaporation of the water contained in the mass to obtain hardening sufficient to allow heating to higher temperature without difficulties entailed by the presence of water. The use of heat in drying and setting also detracts from the strength of the composition.

According to the present invention, improved refractory compositions are prepared by mixing with refractory material in fine grain form, binder material comprising a plurality of ingredients whose proporation may be varied within a given range so as to predetermine the setting time of the refractory composition when given amounts of water are added to produce ramming, trowelling or spraying mixtures and this without lowering the refractoriness of the composition in any material degree. Or the binder materials may be formulated with added barriers so that without the addition of water they may be stored over quite long periods of time without change that would affect the refractoriness of the compositions.

Still further in accordance with the invention, the improved binder materials with selected setting times may be used with practically all high temperature refractory materials without affecting the performance of the binding mixtures. Thus, by way of example, refractory grains that can be used in refractory compositions with the improved binders include chrome ore, magnesia, zirconia, zircon silicate, zirconium oxide, alumina, mullite, kyanite, and other similar high temperature resisting materials or suitable combinations thereof.

The improved binder has less shrinkage upon setting than conventional binders of comparable strength.

DRAWINGS

FIG. 1 illustrates graphically variations in setting time that occur in a binder material consisting essentially of sodium silicate and ammonium pentaborate for ratios thereof ranging from infinity to zero, infinity being the condition in which the binder is a mixture of water and all sodium silicate, and zero being the condition in which the binder is a mixture of water and all ammonium pentaborate; and FIG. 2 illustrates graphically variations in setting time that occur in a refractory composition containing magnesia and different ratios of a binder consisting of sodium silicate and ammonium pentaborate with water added to make a trowelling mix.

DESCRIPTION

As illustrated in the graph FIG. 1 the preferred binder material consists of a mixture of sodium silicate and ammonium pentaborate in a ratio by weight substantially within the range 0.2 to 5.0. These materials after mixture with refractory grains and the addition of water react to form a hard and tough bond for the refractory grains and there is a reduction of shrinkage in the end product with no loss of strength.

A suitable sodium silicate for use in practicing the invention is Dupont's No. 6 sodium silicate, $NaO_2:SiO_2$ whose sodium oxide to silica has a ratio by weight of 1:2. While this sodium silicate is preferred because of its ready availability, satisfactory results are obtained for sodium oxide to silicate ratios within the range 1:½ to 1:4 without appreciably affecting the end product.

Sodium silicate reacts with ammonium pentaborate to set a refractory composition in a much shorter time than if either of such ingredients is used alone. Furthermore, for any given set of conditions, the time required for the binder to set may be varied according to the ratio of sodium silicate to pentaborate selected but for such set of conditions, the setting time will be the same for any selected ratio.

The binder in the ratio selected is mixed with the refractory material to formulate the refractory composition. By way of example, the refractory composition may be prepared for use as in the practice of the invention disclosed in our U.S. Pat. No. 3,241,987 based upon application Ser. No. 173,839 filed Feb. 16, 1962 which was copending with application Ser. No. 391,182, one of the applications on which this continuation-in-part is based. As disclosed in that patent the refractory portion of the refractory composition may be of the order of 85 percent to 98 percent and the binder portion thereof of the order of 2.0 percent to 15 percent, such percentages being by weight.

The amount of water added to the dry composition of refractory and binder in readying it for use will depend upon its type of use, i.e., whether it is to be rammed, trowelled, or sprayed. Such methods of application are conventional with the amount of water necessary to make a mixture of the proper consistency well within the knowledge of a person with the ordinary skill of the art.

The graph of FIG. 1 is not intended to show the actual setting time of all refractory compositions containing a binder of sodium silicate and ammonium pentaborate in a given ratio but merely that the setting time of a mixture of the two in water is much less than the setting time of either binder used alone. It is intended to show also that there is a different setting tine for different ratios of sodium silicate to ammonium pentaborate but that there is a given setting time for each ratio, the conditions otherwise being the same.

The setting time of a refractory composition having a binder consisting of sodium silicate with ammonium pentaborate of different ratios will be different for the different ratios and will be different also from the corresponding ratios of sodium silicate with ammonium pentaborate without refractory as shown in FIG. 1. By way of example, and as shown in FIG. 2, if No. 6 sodium silicate and ammonium pentaborate in ratio by weight of 1 is used as a binder mixture in a magnesia composition prepared as a trowelling mix containing water to the extent of 10 percent by weight, setting to a rigid strong mass will be accomplished in from 40 to 50 minutes. If either of these binders are used alone in the preparation of the same type of magnesia composition, setting to a rigid and strong mass would not be accomplished until 12 or more hours had passed. When the weight ratio of sodium silicate to ammonium pentaborate in the magnesia refractory mixture becomes 1.25 the setting time becomes 65 to 75 minutes. When the weight ratio of sodium silicate to ammonium pentaborate becomes 0.4 the setting time becomes 20 to 30 minutes. Thus it can be said that the setting times of refractory compositions of selected grain sizes may be varied widely within a chosen time bracket by using a ratio of sodium silicate to pentaborate less than infinity, the condition that obtains with an absence of pentaborate and with only the silicate present to give a setting time undesirably high, but greater than zero, the condition that obtains with an absence of sodium silicate and with only the pentaborate present which likewise gives a setting time undesirably high. Between these two extremes, there is a wide range of ratios by weight of sodium silicate to ammonium pentaborate in which the setting times will be quite fast. For practical purposes this range of ratios by weight of sodium silicate to the ammonium pentaborate is substantially from 0.2 to 5.0.

It will be understood that an adjustment in the sodium silicate to ammonium pentaborate binder ratio may be made to compensate for different refractory materials, the grain sizes used and the temperature conditions employed during use in arriving at the desired setting time. The amount of water necessary to activate the binder also has an effect upon the setting time of the refractory composition. Hence, the amount of water added to the composition should be the minimum required for handling and placing the composition in its selected method of use, i.e., ramming, trowelling, or spraying.

Examples of compositions prepared in accordance with the invention are as follows all percentages being by weight:

EXAMPLE NO. 1

| Refractory materials | Type T60 Tabular Alumina (on 6 mesh) | 45.0% |
|---|---|---|
| | Type T60 Tabular Alumina (on 60 mesh) | 37.0% |
| | Alumina A3 (powdered) | 14.0% |
| Binder Mixture Ratio 0.6 | No. 6 sodium silicate | 1.5% |
| | Ammonium pentaborate | 2.5% |
| | Total | 100.0% |

This composition was prepared in a 50 lb. block using 13 lbs. of water per 100 lbs. of dry material to provide a suitable mix for trowelling. After mixing and filling the mold, the setting time necessary for a self-supporting block required 3-½ hours. A similar block containing either the No. 6 sodium silicate or the ammonium pentaborate in the same overall binder percentage required 12 to 14 hours to set to a self-supporting block. It should be noted that the total binder percentage in this example is only 4 percent and this amount was sufficient to cause the composition to form a tough mass after drying and firing to 2,950° F. The fired block showed no slump whatsoever after firing to 2,950° F. and in addition had less than 1 percent shrinkage.

EXAMPLE NO. 2

| Refractory Materials | Magnesia (thru 5 mesh on 20 mesh) | 50% |
|---|---|---|
| | Magnesia (on 16 mesh) | 12% |
| | Magnesia (powdered) | 33.8% |
| Binder Mixture Ratio 0.667 | No. 6 sodium silicate | 1.6% |
| | Ammonium pentaborate | 2.4% |
| Wetting Agent | Vinsol | 0.2% |
| | Total | 100.0% |

This composition represents high refractory grains bound together with a silicate to borate ratio in the binder mixture of 0.667 which caused the setting of a block (self-supporting) of 50 lbs. size as in Example No. 1 from a trowelling mix in 3 hours. When fired to 2,950° F., this block showed no shrinkage whatsoever.

Applicants are aware that proposal has been made to produce a refractory binder by mixing a refractory material with sodium silicate and an alkali metal or alkali earth metal salt of boric acid to prevent lumping or setting under storage and shipping conditions and that for such binder mixtures claim has been made of improved crushing strengths after heating to temperatures at least of the order 150° C. the alkali metal and the alkali earth metal salts of boric acid that have been proposed are quite stable and any reaction they promote toward enhancing a binding effect depends upon their reaching temperatures of the order of their boiling points. For the most part such temperatures are quite high.

Ammonium pentaborate on the other hand is not stable in the presence of sodium silicate and water. It starts to decompose even at room temperature. The volatile $NH_3$ radical is driven off forming transient or nascent boric acid which reacts with the sodium silicate to effect its solidification on the surface of the refractory material present, i.e. magnesia by way of example. The coating or bond which is formed on the refractory particles is a hard crystalline sodium-silicate borate composition containing water of crystallization. The reaction starts as soon as the sodium silicate, ammonium pentaborate and water are in the presence of each other. The instant binder mixtures can be varied as to their setting time control as well as to their suitability for use with a chosen refractory material. They may be employed with any of the commonly used high temperature refractory materials, either alone or in combinations thereof, and still control the desired setting times and in addition the shrinkage in the end product.

The instant binder mixtures may be used in the processes disclosed in U.S. Pat. Nos. 3,093,496 and 3,093,497 both dated June 11, 1963.

The invention is therefore one which may be used in a great number of refractory compositions where speed in setting is of the essence in order to save down time on furnaces. In addition, its low shrinkage factor precludes early failure of the composition by preventing openings in which the heat may enter to deteriorate the heat fired refractory material.

The refractory grains should be sized for each end use but this has no effect on the pre-chosen binder mixtures but it does have an effect on the shrinkage factor and the ability of the final product to withstand the effect of heat and flame regardless of shape or size.

We claim:

1. A refractory composition suitable for use as a ramming, trowelling, or spraying mixture and characterized by its ability to react in predetermined time and in appropriate amount of water to form a hard crystalline sodium-silicate-borate coating composition on the surface of refractory particles contained in the composition to bind such particles together preparatory to firing to ultimate refractoriness, said refractory composition comprising refractory material in selected grain sizes and, based on the weight of the refractory composition, from 2 percent to 15 percent of binder consisting essentially of sodium silicate and ammonium pentaborate present in a ratio of sodium silicate to ammonium pentaborate substantially within the range of 0.2 to 5.0:1.

2. A refractory composition according to claim 1, wherein the sodium oxide to silica ratio in the sodium silicate is within the range 1:½ to 1:4.

* * * * *